United States Patent
Ikeda et al.

(10) Patent No.: US 7,439,303 B2
(45) Date of Patent: Oct. 21, 2008

(54) PRESSURE-SENSITIVE ADHESIVE FOR MOTOR VEHICLE BRAKE DISC ANTIRUST FILM

(75) Inventors: Huminori Ikeda, Warabi (JP); Atsushi Tezuna, Warabi (JP); Yumiko Matsubayashi, Warabi (JP); Osamu Kanazawa, Warabi (JP)

(73) Assignee: Lintec Corporation, Tokyo (JP)

( * ) Notice: Subject to any disclaimer, the term of this patent is extended or adjusted under 35 U.S.C. 154(b) by 207 days.

(21) Appl. No.: 10/593,467

(22) PCT Filed: Mar. 22, 2005

(86) PCT No.: PCT/JP2005/005982

§ 371 (c)(1),
(2), (4) Date: Sep. 19, 2006

(87) PCT Pub. No.: WO2005/090098

PCT Pub. Date: Sep. 29, 2005

(65) Prior Publication Data

US 2007/0213454 A1  Sep. 13, 2007

(30) Foreign Application Priority Data

Mar. 19, 2004  (JP) .............................. 2004-079651

(51) Int. Cl.
C08F 8/30  (2006.01)
(52) U.S. Cl. ...................................... 525/123
(58) Field of Classification Search .................. 525/123
See application file for complete search history.

(56) References Cited

U.S. PATENT DOCUMENTS

| | | | | |
|---|---|---|---|---|
| 4,537,934 A | * | 8/1985 | Fock et al. | 525/123 |
| 4,839,414 A | * | 6/1989 | Bederke et al. | 524/507 |
| 5,039,172 A | | 8/1991 | Krieger | |
| 5,639,828 A | * | 6/1997 | Briggs et al. | 525/208 |
| 5,681,889 A | * | 10/1997 | Kondo et al. | 524/502 |
| 2002/0037413 A1 | * | 3/2002 | Kishioka et al. | 428/412 |

FOREIGN PATENT DOCUMENTS

| | | |
|---|---|---|
| JP | 7-309510 A | 11/1995 |
| JP | 8-225775 A | 9/1996 |
| JP | 2002-517345 A | 6/2002 |
| JP | 2003-119446 A | 4/2003 |
| JP | 2003-267001 A | 9/2003 |

* cited by examiner

Primary Examiner—Bernard Lipman
(74) Attorney, Agent, or Firm—Sughrue Mion, PLLC

(57) ABSTRACT

According to the present invention, a pressure-sensitive adhesive for a motor vehicle brake disc antirust film, which comprises an acrylic resin based pressure-sensitive adhesive prepared by crosslinking an acrylic copolymer containing a unit based on a (meth)acrylamide based monomer and having a weight average molecular weight of 500,000 to 1,100,000 with a polyisocyanate compound by the utilization of the unit based on a (meth)acrylamide based monomer as a crosslinking base point. The pressure-sensitive adhesive for a motor vehicle brake disc antirust film can provide a motor vehicle brake disc antirust film which is hardly peeled off when adhered onto a motor vehicle wheel.

4 Claims, No Drawings

017c
PRESSURE-SENSITIVE ADHESIVE FOR MOTOR VEHICLE BRAKE DISC ANTIRUST FILM

This is a National Stage entry of International Application PCT/JP2005/005982 with an international filing date of Mar. 22, 2005, which was published as WO 2005/090098 A1, and the complete disclosure of which is incorporated into this application by reference.

TECHNICAL FIELD

The present invention relates to a pressure-sensitive adhesive for a motor vehicle brake disc antirust film which can have the motor vehicle brake disc antirust film to be hardly peeled off when adhered onto a motor vehicle wheel.

BACKGROUND ART

A motor vehicle brake disc is oxidized by rainwater infiltrating from the outside and black rust sticks thereto. Such black rust leads to causes to impair the quietness and comfortability inside the motor vehicle. Accordingly, a motor vehicle brake disc is subjected to waterproof treatment to prevent oxidation.

Conventionally, for the purpose of preventing the black rust on a motor vehicle brake disc, there has been adopted a method in which a molded pulp product is directly fitted on a brake disc. However, such a molded pulp product is poor in water resistance, necessitates a number of steps for fitting and removing it, is high in cost and suffers other disadvantages; accordingly, there has recently been proposed the substitution of such a molded pulp product with a pressure-sensitive adhesive film (Japanese Patent Laid-Open No. 7-309510). Such a pressure-sensitive adhesive film is referred to as an antirust film, and is adhered to a tire wheel because the pressure-sensitive adhesive film has advantages such that it involves simple steps for adhesion and peeling and is capable of preventing the external flaw of the tire wheel. The antirust film is required to have three-dimensional curved surface followability because the tire wheel as an adherend has a three-dimensional curved shape. From such a viewpoint, flexible polyethylene film is used as a substrate film.

On the other hand, a motor vehicle chassis is aerodynamically designed, for the purpose of cooling the brake disc, in such a way that the air flow entering from the front of the motor vehicle is sucked toward tire wheels while the motor vehicle is running. Consequently, an air pressure is exerted from the inside on the antirust film. Thus, there is a problem such that the antirust film is peeled off when a motor vehicle is being transported on a carrier car or when a completed motor vehicle is being subjected to a running test.

Additionally, an aluminum wheel has an advantage that it is superior in workability to a stainless steel wheel, and hence sophistication of design has been advanced for aluminum wheels; aluminum wheels with thin spokes predominate from the viewpoints of mileage improvement by weight reduction, reduction of environmental burdens by decreasing the consumed amounts of materials, and improvement of cooling efficiency of brake discs. As a result, a reduced adhesion area is available for an antirust film to be adhered to an aluminum wheel, and hence there is a tendency that peeling problems are increasingly encountered.

DISCLOSURE OF THE INVENTION

An object of the present invention is to provide, by solving the above described problems, a pressure-sensitive adhesive used for a motor vehicle brake disc antirust film which is hardly peeled off when the motor vehicle brake disc antirust film is adhered onto a motor vehicle wheel.

The present inventors have perfected the present invention by discovering, as a result of a diligent study carried out to solve the above described problems, that the above described problems can be solved by providing an acrylic resin based pressure-sensitive adhesive prepared by crosslinking an acrylic copolymer containing a unit based on a (meth)acrylamide based monomer and having a weight average molecular weight of 500,000 to 1,100,000 with a polyisocyanate compound by the utilization of the unit based on a (meth)acrylamide based monomer as a crosslinking base point.

Specifically, the present invention provides a pressure-sensitive adhesive for a motor vehicle brake disc antirust film, which comprises an acrylic resin based pressure-sensitive adhesive prepared by crosslinking an acrylic copolymer containing a unit based on a (meth)acrylamide based monomer and having a weight average molecular weight of 500,000 to 1,100,000 with a polyisocyanate compound by the utilization of the unit based on a (meth)acrylamide based monomer as a crosslinking base point.

Additionally, the present invention provides the pressure-sensitive adhesive for a motor vehicle brake disc antirust film as described above, wherein the content of the unit based on a (meth)acrylamide based monomer in the acrylic copolymer is 0.01 to 30 parts by mass relative to 100 parts by mass of the acrylic copolymer.

Additionally, the present invention provides the pressure-sensitive adhesive for a motor vehicle brake disc antirust film as described above, wherein the pressure-sensitive adhesive for a motor vehicle brake disc antirust film comprises an ultraviolet absorber in a proportion of 0.01 to 20 parts by mass relative to 100 parts by mass of the acrylic resin based pressure-sensitive adhesive in such a way that the spectral transmittance of the motor vehicle brake disc antirust film in a wavelength region from 200 to 380 nm falls within a range from 0 to 20%.

Further, the present invention provides a motor vehicle brake disc antirust film, which comprises a pressure-sensitive adhesive layer containing the pressure-sensitive adhesive as described above, wherein the pressure-sensitive adhesive layer is formed on one surface of the surface substrate film.

The motor vehicle brake disc antirust film, in which the pressure-sensitive adhesive layer containing the pressure-sensitive adhesive of the present invention is formed on one surface of the surface substrate film, is hardly peeled off and excellent in prevention of black rust to be formed on a motor vehicle brake disc, when the surface of the pressure-sensitive adhesive layer is adhered to the wheel so as for the surface of the pressure-sensitive adhesive layer to face and touch the wheel.

PREFERRED EMBODIMENTS FOR CARRYING OUT THE INVENTION

The pressure-sensitive adhesive for a motor vehicle brake disc antirust film of the present invention comprises an acrylic resin based pressure-sensitive adhesive prepared by crosslinking an acrylic copolymer containing a unit based on a (meth)acrylamide based monomer and having a weight average molecular weight of 500,000 to 1,100,000 with a polyisocyanate compound by the utilization of the unit based on a (meth)acrylamide based monomer as a crosslinking base point.

The (meth)acrylamide based monomer includes (meth)acrylamides such as acrylamide and methacrylamide; alkoxyalkyl(meth)acrylamides such as ethoxymethylacrylamide, propoxymethylacrylamide, buthoxymethylacrylamide, ethoxymethylmethacrylamide, propoxymethylmethacrylamide and buthoxymethylmethacrylamide; and N-alkanolated (meth) acrylamides such as N-methylol acrylamide and N-methylol methacrylamide. The carbon atom number of the (meth)acrylamide based monomer is preferably 3 to 10, and more preferably 3 to 8.

The acrylic copolymer contains a unit based on a (meth)acrylic acid alkyl ester and optionally a unit based on the other copolymerizable monomers other than the unit based on a (meth)acrylamide based monomer.

The (meth)acrylic acid alkyl ester includes methyl acrylate, ethyl acrylate, propyl acrylate, butyl acrylate, isobutyl acrylate, pentyl acrylate, hexyl acrylate, octyl acrylate, isooctyl acrylate, 2-ethylhexyl acrylate, decyl acrylate, isodecyl acrylate, lauryl acrylate, stearyl acrylate, dodecyl acrylate, isododecyl acrylate, methyl methacrylate, ethyl methacrylate, propyl methacrylate, butyl methacrylate, isobutyl methacrylate, pentyl methacrylate, hexyl methacrylate, octyl methacrylate, isooctyl methacrylate, 2-ethylhexyl methacrylate, decyl methacrylate, isodecyl methacrylate, lauryl methacrylate, stearyl methacrylate, dodecyl methacrylate and isododecyl methacrylate. The carbon atom number of the (meth)acrylic acid alkyl ester is preferably 4 to 16, and more preferably 4 to 10. The (meth)acrylic acid alkyl ester can be utilized singly or in a combination of two or more members.

The other copolymerizable monomers include copolymerizable monomers in which one or more polar groups such as hydroxyl group, methylol group, glycidyl group, ethyleneimino group and isocyanate group is substituted in the (meth)acrylic acid alkyl ester as described above. Further, the other copolymerizable monomers include vinyl esters such as vinyl acetate and vinyl propyonate, vinyl nitrile compounds such as acrylonitrile and methacrylonitrile, vinyl aromatic compounds such as styrene and vinylpyridine, and diene compounds such as butadiene and chloroprene. The vinyl esters are preferable among the other copolymerizable monomers. The other copolymerizable monomers can be used singly or in a combination of two or more members.

The acrylic copolymer can be prepared by copolymerizing the (meth)acrylamide based monomer described above and the (meth)acrylic acid alkyl ester, and optionally the other copolymerizable monomers. The copolymerization can be conducted in various methods such as solution polymerization, bulk polymerization, suspension polymerization and emulsion polymerization. Preferable copolymerization is a copolymerization in the presence of a polymerization initiator. The polymerization initiator include preferably peroxide polymerization initiators and azo polymerization initiators.

The content of the unit based on a (meth)acrylamide based monomer in the acrylic copolymer is preferably 0.01 to 30 parts by mass, more preferably 0.1 to 20 parts by mass, further more preferably 0.5 to 9 parts by mass, most preferably 1 to 5 parts by mass, based on 100 parts by mass of the acrylic copolymer.

The content of the unit based on a (meth)acrylic acid alkyl ester in the acrylic copolymer is preferably 65 to 95 parts by mass, more preferably 70 to 90 parts by mass, most preferably 75 to 85 parts by mass, based on 100 parts by mass of the acrylic copolymer.

The content of the unit based on the other copolymerizable monomers in the acrylic copolymer is preferably 5 to 30 parts by mass, more preferably 10 to 25 parts by mass, most preferably 15 to 20 parts by mass, based on 100 parts by mass of the acrylic copolymer.

The weight average molecular weight of the acrylic copolymers is preferably 500,000 to 1,100,000, more preferably 600,000 to 1,000,000, and most preferably 650,000 to 950,000.

The pressure-sensitive adhesive of the present invention comprises the acrylic resin based pressure-sensitive adhesive prepared by crosslinking the acrylic copolymer as described above with a polyisocyanate compound by the utilization of the unit based on a (meth)acrylamide based monomer as a crosslinking base point.

Examples of the polyisocyanate compound include tolylene diisocyanate (TDI), hexamethylene diisocyanate (HMDI), isophorone diisocyanate (IPDI), xylene diisocyanate (XDI), hydrogenated tolylene diisocyanate, diphenylmethane diisocyanate and the hydrogenated product thereof, polymethylenepolyphenyl polyisocyanate, naphthylene-1,5-diisocyanate, polyisocyanate prepolymer and polymethylolpropane modified TDI. Preferred as the polyisocyanate compounds are diisocyanate compounds, triisocyanate compounds, tetraisocyanate compounds and pentaisocyanate compounds; particularly preferred are diisocyanate compounds and triisocyanate compounds.

The closslinking with the polyisocyanate is conducted by reacting the unit based on a (meth)acrylamide based monomer with the polyisocyanate compound. Specifically, the closslinking with the polyisocyanate is conducted by reacting the unit based on a (meth)acrylamide based monomer with the isocyanate group of the polyisocyanate compound to form an urea bond or a biuret bond. By this closslinking, the pressure-sensitive adhesive of the present invention has superior pressure-sensitive adhesive strength and superior cohesive force together, and exerts superior properties as the strong pressure-sensitive adhesive strength and removable type pressure-sensitive adhesive for a motor vehicle brake disc antirust film.

By controlling the crosslinking amounts of the polyisocyanate compounds, pressure-sensitive adhesive physical properties required for various coated surfaces can be attained. The use amount of each of the polyisocyanate compounds is preferably 0 to 20 parts by mass, more preferably 0.01 to 10 parts by mass relative to 100 parts by mass of an acrylic copolymer. The polyisocyanate compounds can be used each alone or in combinations of two or more thereof.

When crosslinking is carried out, it is preferable to fully mix together an acrylic copolymer and a polyisocyanate compound, in particular, to fully mix together in a solvent. The total concentration of the acrylic copolymer and the polyisocyanate compound in the solvent is preferably 20 to 80% by mass, and particularly preferably 30 to 70% by mass. Examples of the solvent include fatty acid esters such as ethyl acetate; ketones such as methyl ethyl ketone and diethyl ketone; aliphatic hydrocarbons such as hexane, heptane and octane; and aromatic hydrocarbons such as benzene and toluene. These solvents can be used each alone or in combinations of two or more thereof. As the solvent, the polymerization solvent of the acrylic copolymer may also be used as it is.

The crosslinking temperature can be appropriately selected; however, usually, it may be 0 to 100° C., and is preferably 10 to 40° C. The crosslinking may be carried out in a state of a solution, or either during or after drying subsequent to the coating.

It is preferable to make the pressure-sensitive adhesive layer of the present invention including an ultraviolet absorber in such a way that the spectral transmittance of the pressure-sensitive adhesive layer in a wavelength region from 200 to 380 nm falls within a range from 0 to 20%. The including ratio of the ultraviolet absorber is preferably 0.01 to 20% by mass relative to 100 parts by mass of the solid component of the acrylic resin based pressure-sensitive adhesive. The inclusion of the ultraviolet absorber improves the resistance to weather, and the film can be peeled off without leaving any pressure-sensitive adhesive deposit on the adherend even when exposed in outdoor over a long period of time.

Specific examples of the ultraviolet absorber include hydroquinone-based ultraviolet absorbers, salicylate-based ultraviolet absorbers, benzophenone-based ultraviolet absorbers, benzotriazole-based ultraviolet absorbers and cyanoacrylate-based ultraviolet absorbers.

Examples of the hydroquinone-based ultraviolet absorbers include hydroquinone and hydroquinone disalicylate. Examples of the salicylate-based ultraviolet absorbers include phenyl salicylate and p-octylphenyl salicylate. Examples of benzophenone-based ultraviolet absorbers include 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, 2,2'-dihydroxy-4,4'-dimethoxybenzophenone, 2-hydroxy-4-benzoyloxybenzophenone, 2,2'-dihydroxy-4-methoxybenzophenone, 2-hydroxy-4-methoxy-5-sulfonebenzophenone, 2,2',4,4'-tetrahydroxybenzophenone, 2,2'-dihydroxy-4,4'-dimethoxy-5-sodiumsulfobenzophenone, 4-dodecyloxy-2-hydroxybenzophenone, and 2-hydroxy-5-chlorobenzophenone.

Examples of the benzotriazole-based ultraviolet absorbers include 2-(2'-hydroxy-3'-t-butyl-5'-methylphenyl)-5-chlorobenzotriazole, 2-(2'-hydroxy-5'-methylphenyl)benzotriazole, 2-(2'-hydroxy-5'-methylphenyl)-5-carboxylic acid butyl ester benzotriazole, 2-(2'-hydroxy-5'-methylphenyl)-5,6-dichlorobenzotriazole, 2-(2'-hydroxy-5'-methylphenyl)-5-ethylsulfonebenzotriazole, 2-(2'-hydroxy-5'-t-butylphenyl)-5-chlorobenzotriazole, 2-(2'-hydroxy-5'-t-butylphenyl)benzotriazole, 2-(2'-hydroxy-5'-amylphenyl)benzotriazole, 2-(2'-hydroxy-3',5'-dimethylphenyl)benzotriazole, 2-(2'-hydroxy-3',5'-dimethylphenyl)-5-methoxybenzotriazole, 2-(2'-methyl-4'-hydroxyphenyl)benzotriazole, 2-(2'-stearyloxy-3',5'-dimethylphenyl)-5-methylbenzotriazole, 2-(2'-hydroxy-5-carboxylic acid phenyl)benzotriazole ethyl ester, 2-(2'-hydroxy-3'-methyl-5'-t-butylphenyl)benzotriazole, 2-(2'-hydroxy-3',5'-di-t-butylphenyl)-5-chlorobenzotriazole, 2-(2'-hydroxy-5-methoxyphenyl)benzotriazole, 2-(2'-hydroxy-5'-phenylphenyl)-5-chlorobenzotriazole, 2-(2'-hydroxy-5'-cyclohexylphenyl)benzotriazole, 2-(2'-hydroxy-4',5'-dimethylphenyl)-5-carboxylic acid benzotriazole butyl ester, 2-(2'-hydroxy-3',5'-dichlorophenyl)benzotriazole, 2-(2'-hydroxy-4',5'-dichloro)benzotriazole, 2-(2'-hydroxy-3',5'-dimethylphenyl)-5-ethylsulfonebenzotriazole, 2-(2'-hydroxy-5'-phenylphenyl)benzotriazole, 2-(2'-hydroxy-5'-octoxyphenyl)benzotriazole, 2-(2'-hydroxy-4'-octoxyphenyl)benzotriazole, 2-(2'-hydroxy-5'-methoxyphenyl)-5-methylbenzotriazole, 2-(2'-hydroxy-5'-methylphenyl)-5-carboxylic acid ester benzotriazole, 2-(2'-acetoxy-5'-methylphenyl)benzotriazole, 2-(2'-hydroxy-3',5'-di-t-butylphenyl)-5-chlorobenzotriazole, and 2-2'-methylenebis[6-(2-benzotriazol-2-yl)-4-(1,1,3,3-tetramethylbutyl)phenol]. Examples of the cyanoacrylate-based ultraviolet absorbers include ethyl 2-cyano-3,3-diphenylacrylate and 2-ethylhexyl 2-cyano-3,3-diphenylacrylate.

Preferred among these ultraviolet absorbers are the benzophenone-based ultraviolet absorbers and the benzotriazole-based ultraviolet absorbers. In particular, preferred as the benzophenone-based ultraviolet absorbers are 2,3'-dihydroxy-4,4'-dimethoxybenzophenone, 2,2'-dihydroxy-4-methoxybenzophenone and 2,2',4,4'-tetrahydroxybenzophenone; and preferred as the benzotriazole-based ultraviolet absorbers are 2-(2'-hydroxy-5'-methylphenyl)benzotriazole, 2-(2'-hydroxy-5'-methylphenyl)-5,6-dichlorobenzotriazole, 2-(2'-hydroxy-5'-t-butylphenyl)benzotriazole, 2-(2'-hydroxy-3'-methyl-5'-t-butylphenyl)benzotriazole, 2-(2'-hydroxy-3',5'-di-t-butylphenyl)-5-chlorobenzotriazole, 2-(2'-hydroxy-5'-phenylphenyl)-5-chlorobenzotriazole, 2-(2'-hydroxy-3'-t-butyl-5'-methylphenyl)-5-chlorobenzotriazole, and 2-(2'-hydroxy-5'-octoxyphenyl)benzotriazole.

These ultraviolet absorbers can be used each alone or in combinations of two or more thereof.

Additionally, one or more weather resistant agents such as a photostabilizer and an antioxidant can be appropriately included together with the ultraviolet absorber.

Additionally, one of more of a tackifier, a softener, a leveling agent, a silane coupling agent, a filler, a colorant such as a dye or a pigment, or a solvent can be appropriately mixed in the pressure-sensitive adhesive, according to needs.

The surface substrate film for a motor vehicle brake disc antirust film is a substrate film for arranging as the surface in the motor vehicle brake disc antirust film.

The pressure-sensitive adhesive of the present invention is preferably applied on one surface of the surface substrate film for a motor vehicle brake disc antirust film, and dried to form the pressure-sensitive adhesive layer. The drying of the pressure-sensitive adhesive is conducted preferably at the temperature higher than room temperature in order to prevent residues of the solvent, the component having low boiling point, and the like.

No particular constraint is imposed on the thickness of the pressure-sensitive adhesive layer, but the thickness may usually be 1 to 300 µm, and is preferably 2 to 150 µm and particularly preferably 5 to 100 µm.

The surface substrate film for a motor vehicle brake disc antirust film can be made of various materials. AS preferable materials, a low density polyethylene resin is preferable. Also, a mixture composed of low density polyethylene resin and high density polyethylene resin, a polyethylene terephthalate resin and a polypropylene resin can be used.

The density of the low density polyethylene resin is preferably 0.910 to 0.940 g/cm$^3$, more preferably 0.918 to 0.938 g/cm$^3$ and particularly preferably 0.923 to 0.933 g/cm$^3$.

The surface substrate film for a motor vehicle brake disc antirust film may be formed of either a single layer or multiple layers having two or more layers of the same type or different types. Additionally, the surface substrate film for a motor vehicle brake disc antirust film may be subjected to a drawing treatment such as a uniaxial drawing or a biaxial drawing.

Examples of the method for molding the surface substrate film include the extrusion molding method and the inflation molding method; however, the inflation molding method is preferable.

As the drawing method, various drawing methods can be applied. Examples of such a drawing method include a longitudinal uniaxial drawing method based on a group of rollers different from each other in circumferential velocity, a lateral uniaxial drawing method based on a tenter oven, a biaxial drawing method as a combination of these methods, and a tubular drawing method based on inflation.

The surface substrate film may be subjected to an annealing treatment after drawing.

No particular constraint is imposed on the thickness of the surface substrate film for a motor vehicle brake disc antirust film; however, usually the thickness falls preferably within a range from 20 to 200 μm, and particularly preferably within a range from 30 to 100 μm.

The surface substrate film for a motor vehicle brake disc antirust film is preferably made to include an ultraviolet absorber in such a way that the spectral transmittance of the surface substrate film in a wavelength region from 200 to 380 nm falls within a range from 0 to 20%. The including ratio of the ultraviolet absorber is preferably 0.01 to 20 parts by mass based on 100 parts by mass of the resin solid component of the substrate film. The inclusion of the ultraviolet absorber improves the resistance to weather, and the film can be peeled off without leaving any pressure-sensitive adhesive deposit on the adherend even when exposed in outdoor over a long period of time.

Additionally, one or more weather resistant agents such as a photostabilizer and an antioxidant can be appropriately included together with the ultraviolet absorber.

The pressure-sensitive adhesive layer may be formed by directly coating one surface of the surface substrate film, or may be formed on one surface of the surface substrate film by bonding the surface of the pressure-sensitive adhesive layer of a release liner and the surface substrate film to each other, wherein the release liner has been prepared as a release liner with the pressure-sensitive adhesive layer formed by coating beforehand a pressure-sensitive adhesive on the releasing agent layer surface of the release liner and by drying the pressure-sensitive adhesive layer. No particular constraint is imposed on the method for forming the pressure-sensitive adhesive layer, and various methods can be adopted. Examples of such methods include methods for forming by coating with the following coaters and drying: an airknife coater, a blade coater, a bar coater, a gravure coater, a roll coater, a roll knife coater, a curtain coater, a die coater, a knife coater, a screen coater, a Mayer bar coater and a kiss coater.

The surface of the pressure-sensitive adhesive layer is preferably covered with a release liner. Alternatively, without using a release liner, it is possible to impart releasability to the surface substrate film by coating a releasing agent on the surface of the surface substrate film, prepare a pressure-sensitive adhesive film in which a pressure-sensitive adhesive layer is provided on the nonreleasing surface of the surface substrate film, and roll pressure-sensitive adhesive film thus obtained in such a way that the releasing surface and the surface of the pressure-sensitive adhesive layer are brought into contact with each other to store. Thus, the surface of the pressure-sensitive adhesive layer can be protected.

As the release liner, any types may be used. For example, there can be used a release liner in which the surface, to be bonded to the pressure-sensitive adhesive layer, of the substrate of the release liner is subjected to a release treatment, if needed, wherein adopted as the substrate are the films formed of various resins such as polyethylene terephthalate, polybutylene terephthalate, polyethylene, polypropylene and polyacrylate, and also are various paper materials such as polyethylene laminate paper, polypropylene laminate paper, clay coated paper, resin coated paper, glassine paper and woodfree paper.

In this case, typical examples of the release treatment include the formation of a releasing agent layer formed of a releasing agent such as a silicone-based resin, a long-chain alkyl based resin or a fluorine-based resin.

No particular constraint is imposed on the thickness of the release liner, and the thickness may be appropriately selected. Adhesion, to an adherend, of the motor vehicle brake disc antirust film which has the pressure-sensitive adhesive layer formed on one surface of the surface substrate film for a motor vehicle brake disc antirust film by using the pressure-sensitive adhesive for a motor vehicle brake disc antirust film of the present invention can be carried out by preferably providing a pressure-sensitive adhesive layer on one surface of the surface substrate film, peeling off the release liner when the release liner covers the surface of the pressure-sensitive adhesive layer, and adhering the pressure-sensitive adhesive layer onto the surface of the adherend such as a wheel. Alternatively, after the release liner having the pressure-sensitive adhesive layer is prepared preliminary by applying the pressure-sensitive adhesive layer on the surface of a release agent layer of the release liner, and drying to form the pressure-sensitive adhesive, the motor vehicle brake disc antirust film can also be adhered onto the surface of the adherend by adhering a surface of the pressure-sensitive adhesive layer of the release liner on the surface of the adherend such as a wheel, peeling the release liner and then laminating the surface of the pressure-sensitive layer with the surface substrate film.

EXAMPLES

Hereinafter, specific description will be made on the present invention with reference to Examples. However, the present invention is not limited at all by these Examples.

Example 1

Preparation of a Surface Substrate Film

By using a low density polyethylene resin having a density of 0.928 g/cm$^3$ as the raw material, a polyethylene resin film having a thickness of 50 μm was prepared with an inflation film molding machine.

Preparation of an Acrylic Copolymer

In a reaction apparatus equipped with a thermometer, a stirrer, a reflux condenser tube and a nitrogen gas introduction tube, 54 parts by mass of 2-ethylhexyl acrylate, 27 parts by mass of ethyl acrylate, 17 parts by mass of vinyl acetate, 2 parts by mass of acrylic amide and 100 parts by mass of ethyl acetate were placed, and the reaction mixture thus obtained was allowed to copolymerize in the presence of a polymerization initiator, namely, azobisisobutyronitrile, to yield an acrylic copolymer having a weight average molecular weight of 800,000.

Preparation of a Pressure-Sensitive Adhesive Film Provided with a Pressure-Sensitive Adhesive Layer A mixture was prepared by adding 3.0 parts by mass of an isocyanate-based crosslinking agent (trade name: Coronate L, manufactured by Japan Polyurethane Industry Co., Ltd.) to 100 parts by mass of the resin component of the above described acrylic copolymer. The mixture thus obtained was applied, with a Mayer bar at room temperature (25° C.), on one surface of a surface substrate film that was the above described polyethylene resin film having a thickness of 50 μm so as for the coating amount after drying to be 25 μm, and then dried at 40° C. to prepare a crosslinked pressure-sensitive adhesive layer. Thereafter, the release layer of a release liner and the above described pressure-sensitive adhesive layer were bonded with a laminator to prepare a pressure-sensitive adhesive film, wherein the release liner (trade name: KGM-11S White, manufactured by Lintec Corp.) was a product obtained by forming a release layer by coating a silicone resin as a releasing agent on one surface of a support made of a woodfree paper.

Example 2

A mixture was prepared by mixing 3 parts by mass of a benzotriazole-based ultraviolet absorber (2-(2'-hydroxy-3'-tert-butyl-5'-methylphenyl)-5-chlorobenzotriazole, trade name: Tinuvin 326, manufactured by Ciba Specialty Chemicals Corp.) in 100 parts by mass of the resin component of the acrylic resin based pressure-sensitive adhesive of Example 1. A pressure-sensitive adhesive film was prepared in the same manner as in Example 1 except that the mixture thus obtained was used as the pressure-sensitive adhesive and the polyethylene film in Example 1 was used as the surface substrate film. A spectral transmittance in a wavelength region from 200 to 380 nm of the pressure-sensitive adhesive film was less than 1%.

Comparative Example 1

In a reaction apparatus equipped with a thermometer, a stirrer, a reflux condenser tube and a nitrogen gas introduction tube, 54 parts by mass of 2-ethylhexyl acrylate, 27 parts by mass of ethyl acrylate, 17 parts by mass of vinyl acetate, 2 parts by mass of acrylic acid and 100 parts by mass of ethyl acetate were placed, and the reaction mixture thus obtained was allowed to copolymerize in the presence of a polymerization initiator, namely, azobisisobutyronitrile, to yield an acrylic copolymer having a weight average molecular weight of 800,000.

A pressure-sensitive adhesive film was prepared in the same manner as in Example 1 except that the acrylic resin based pressure-sensitive adhesive thus obtained was used as the pressure-sensitive adhesive.

Comparative Example 2

In a reaction apparatus equipped with a thermometer, a stirrer, a reflux condenser tube and a nitrogen gas introduction tube, 54 parts by mass of 2-ethylhexyl acrylate, 27 parts by mass of ethyl acrylate, 17 parts by mass of vinyl acetate, 2 parts by mass of acrylic amide and 100 parts by mass of ethyl acetate were placed, and the reaction mixture thus obtained was allowed to copolymerize in the presence of a polymerization initiator, namely, azobisisobutyronitrile, to yield an acrylic copolymer having a weight average molecular weight of 400,000.

A pressure-sensitive adhesive film was prepared in the same manner as in Example 1 except that the acrylic resin based pressure-sensitive adhesive thus obtained was used as the pressure-sensitive adhesive.

Comparative Example 3

In a reaction apparatus equipped with a thermometer, a stirrer, a reflux condenser tube and a nitrogen gas introduction tube, 54 parts by mass of 2-ethylhexyl acrylate, 27 parts by mass of ethyl acrylate, 17 parts by mass of vinyl acetate, 2 parts by mass of acrylic acid and 100 parts by mass of ethyl acetate were placed, and the reaction mixture thus obtained was allowed to copolymerize in the presence of a polymerization initiator, namely, azobisisobutyronitrile, to yield an acrylic copolymer having a weight average molecular weight of 1,200,000.

A pressure-sensitive adhesive film was prepared in the same manner as in Example 1 except that the acrylic resin based pressure-sensitive adhesive thus obtained was used as the pressure-sensitive adhesive.

Measurements of Physical Properties of Pressure-Sensitive Adhesive Films

The surface substrate films and the pressure-sensitive adhesive films prepared in Examples and Comparative Example were subjected to the following tensile modulus of elasticity measurement, pressure-sensitive adhesive strength measurement, sunshine weatherometer (hereinafter abbreviated as SWOM) test, and film peeling test and adherend staining test after motor vehicle running. The results thus obtained are shown in Table 1.

(1) Measurement of Pressure-Sensitive Adhesive Strength

The pressure-sensitive adhesive films prepared in above described Examples and Comparative Example were subjected to the measurement of the pressure-sensitive adhesive strength in an environment of 23.C and 50% RH in conformity with JIS Z0237 wherein an aluminum plate coated with a paint (trade name: Magicron ALC-2-1, manufactured by Kansai Paint Co., Ltd.) was used as an adherend.

(2) SWOM Test

The pressure-sensitive adhesive films prepared in above described Examples and Comparative Example were subjected to the measurement of the pressure-sensitive adhesive strength based on the above described measurement method after a 500 hour irradiation and a 1000 hour irradiation in SWOM (trade name: Sunshine Super Long Life Weatherometer WEL-SUN-HCH, manufactured by Suga Test Instruments Co., Ltd.).

(3) Film Peeling Test after Motor Vehicle Running

Each of the pressure-sensitive adhesive films prepared in above described Examples and Comparative Example was adhered onto the surface of an aluminum wheel of a motor vehicle (trade name: Cercio, manufactured by Toyota Motor Corp.); the motor vehicle was driven at a speed of 80 km/hour for 60 minutes and then the peeling of the adhered pressure-sensitive adhesive film was evaluated on the basis of the following standards.

Good: No peeling occurred.
Poor: Peeling occurred.

(4) Adherend Staining Test

Each of the pressure-sensitive adhesive films prepared in above described Examples and Comparative Example was adhered onto an adherend prepared with an aluminum plate coated with a paint (trade name: Magicron ALC-2-1, manufactured by Kansai Paint Co., Ltd.), and was subjected, as it was adhered, to a SWOM test; after a SWOM test for 500 hours and 1,000 hours, the adherend with the pressure-sensitive adhesive film was taken out, and the adhered pressure-sensitive adhesive film was peeled off from the adherend; the staining state of the adherend at the time of this peeling off was evaluated on the basis of the following standards.

Good: The adherend was not stained.
Poor: The adherend was stained.

TABLE 1

|  | Example 1 | Example 2 | Comp. Ex. 1 | Comp. Ex. 2 | Comp. Ex. 3 |
| --- | --- | --- | --- | --- | --- |
| Crosslinking base point of acrylic copolymer | Acrylic amide | Acrylic amide | Acrylic acid | Acrylic amide | Acrylic amide |
| Weight average molecular weight of acrylic copolymer | 800,000 | 800,000 | 800,000 | 400,000 | 1,200,000 |

TABLE 1-continued

|  | Example 1 | Example 2 | Comp. Ex. 1 | Comp. Ex. 2 | Comp. Ex. 3 |
|---|---|---|---|---|---|
| Ultraviolet absorber (parts by mass) | — | 3 | — | — | — |
| Pressure-sensitive adhesive strength under environment of 23° C. and 50% RH (N/25 mm) | 7.0 | 7.1 | 4.5 | 6.2 | 6.1 |
| Pressure-sensitive adhesive strength after SWOM for 500 hr (N/25 mm) | 8.2 | 7.3 | 7.9 | — | — |
| Pressure-sensitive adhesive strength after SWOM for 1,000 hr (N/25 mm) | 10.8 | 7.3 | — | — | — |
| Peeling after motor vehicle running | Good | Good | Poor | Poor | Poor |
| Adherend staining after SWOM for 500 hr | Good | Good | Poor | — | — |
| Adherend staining after SWOM for 1,000 hr | Poor | Good | — | — | — |

Because the weight average molecular weight of the acrylic copolymer is 800,000 in Examples 1, the pressure-sensitive adhesive strength under environment of 23° C. and 50% RH is high and there was no peeling of the film after motor vehicle running. Further, there was no adherend staining after 500 hours of the SWOM test. Accordingly, high pressure-sensitive adhesive strength and high cohesive force were verified, when the crosslinking was conducted with the polyisocyanate compound.

In Example 2 in which an ultraviolet absorber was added into the pressure-sensitive adhesive of Example 1, there was no peeling of the film after motor vehicle running as same as Example 1. Further, in Example 2, there was no adherend staining even after 1,000 hours of the SWOM test, though the film has not been exposed under the environment corresponding to 1,000 hours of the SWOM test in the practical condition. Accordingly, prevention of degradation in pressure-sensitive adhesive was verified.

In Comparative Example 1, acrylic acid is used as the unit of monomer at the crosslinking point, and the crosslinking is conducted with the polyisocyanate compound as same as Example 1. In Comparative Example 1, the pressure-sensitive adhesive strength is low compared with Example 1 and the peeling of the film was observed after motor vehicle running test.

In Comparative Example 2, the pressure-sensitive adhesive is the same as that of Example 1, but the weight average molecular weight is controlled low to be 40,000. In Comparative Example 2, the pressure-sensitive adhesive strength is low compared with Example 1 and the peeling of the film was observed after motor vehicle running test.

In Comparative Example 3, the pressure-sensitive adhesive is the same as that of Example 1, but the weight average molecular weight is controlled high to be 1,200,000. In Comparative Example 3, the pressure-sensitive adhesive strength is low compared with Example 1 and the peeling of the film was observed after motor vehicle running test.

The pressure-sensitive adhesive film for a motor vehicle brake disc antirust film of the present invention can be utilized as a motor vehicle brake disc antirust film by applying on one surface of the surface substrate film.

What is claimed is:

1. A pressure-sensitive adhesive for a motor vehicle brake disc antirust film, which comprises an acrylic resin based pressure-sensitive adhesive prepared by crosslinking an acrylic copolymer containing a unit based on a (meth)acrylamide based monomer and having a weight average molecular weight of 500,000 to 1,100,000 with a polyisocyanate compound by the utilization of the unit based on a (meth)acrylamide based monomer as a crosslinking base point.

2. The pressure-sensitive adhesive for a motor vehicle brake disc antirust film as claimed in claim 1, wherein the content of the unit based on a (meth)acrylamide based monomer in the acrylic copolymer is 0.01 to 30 parts by mass relative to 100 parts by mass of the acrylic copolymer.

3. The pressure-sensitive adhesive for a motor vehicle brake disc antirust film as claimed in claim 1, wherein the pressure-sensitive adhesive for a motor vehicle brake disc antirust film comprises an ultraviolet absorber in a proportion of 0.01 to 20 parts by mass relative to 100 parts by mass o the acrylic resin based pressure-sensitive adhesive in such a way that the spectral transmittance of the motor vehicle brake disc antirust film in a wavelength region form 200 to 380 nm falls within a range from 0 to 20%.

4. A motor vehicle brake disc antirust film, which comprises a pressure-sensitive adhesive layer containing the pressure-sensitive adhesive as claimed in any one of claims 1, wherein the pressure-sensitive adhesive layer is formed on one surface of the surface substrate film.

* * * * *